Patented June 24, 1930

1,768,112

UNITED STATES PATENT OFFICE

JOSEPH H. BRENNAN, OF NIAGARA FALLS, NEW YORK, ASSIGNOR TO ELECTRO METALLURGICAL COMPANY, A CORPORATION OF WEST VIRGINIA

TREATING MANGANESE ORES

No Drawing.  Application filed June 28, 1928.  Serial No. 289,086.

The invention is a process of treating manganese ores to increase the ratio of manganese to iron.

When manganese ores are used in the preparation of ferromanganese, a moderate percentage of iron in the ore is unobjectionable, but when non-ferrous alloys or manganese metal are to be made, the iron content of the ore should be as low as possible. In the latter case specially selected ores of high cost are used, or ordinary ores are chemically treated for the removal of iron. The present invention affords a means of eliminating a portion of the iron from ores of ordinary quality.

The invention is especially applicable to ores of the dioxide or pyrolusite type. Such ores may be silico-thermically reduced in a self-propagating reaction, the proportions of silicon-containing reducing agent and ore being so chosen that there is a preferential reduction of iron. The process is preferably so conducted that not more than a minor part of the manganese present is completely reduced to the metallic state in the self-propagating stage. The unreduced manganese, which exists as a lower oxide (for example MnO) combined with the silica produced in the reaction as a fusible manganese silicate slag low in iron, is readily separated from the metallic product of reduction which contains most of the iron. The manganese silicate slag can then be smelted in any suitable way, as for example by the methods currently used in smelting manganese ores, to give metal or alloys correspondingly low in iron.

Commercially pure silicon, ferrosilicon and other silicon alloys, including manganese-silicon, may be used in the self-propagating reduction. If manganese-silicon is used as the reducing agent the products will be a manganese-containing material low in iron, and an alloy containing manganese and the major portion of the iron originally present in the ore, such alloy being useful where a considerable percentage of iron is unobjectionable.

In the self-propagating stage the principal reaction is represented by the equation $$2MnO_2 + Si = 2MnO + SiO_2$$

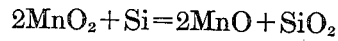

The quantity of silicon which will be consumed in this reaction can be readily calculated from the analysis of the ore. A small additional quantity of silicon will be consumed in reducing iron. Some excess over the sum of these quantities is usually employed, which excess in part enters the alloy produced, and in part is consumed in completely reducing manganese to metal, as will appear from the specific examples infra.

The ore and the silicon should be intimately mixed, and preferably both are finely ground, for example so that 90% will pass a 100 mesh screen. The reaction is more vigorous if the mixture is thoroughly dried. The application of external heat and the addition of auxiliary oxidizers or "promoters" is not precluded, but in general such measures will be unnecessary because of the abundance of loosely bound oxygen present in the ore. Indeed, it may be desirable to add a non-reacting material to the charge to absorb some of the heat of the reaction, since the reaction tends to become violent under the most strongly exothermic conditions.

An additional advantageous feature of the process is that the phosphorus present in the charge tends to segregate in the metallic portion of the reaction products, so that a simultaneous elimination of iron and phosphorus is effected.

The following are specific examples of the invention.

I. The charge consisted of an intimate mixture of finely ground materials, as follows:

| | Parts |
|---|---|
| Manganese ore | 100 |
| Silicon metal | 17.5 |

The ore analyzed as follows:

| | Per cent |
|---|---|
| Mn (largely as $MnO_2$ | 49.87 |
| Fe | 6.08 |
| P | 0.145 |

The silicon metal was more than 95% Si. The mixture was ignited in a pot having a refractory lining and reacted rapidly, yielding very hot and fluid products of the following analysis:

*Manganese silicate slag*

| | Per cent |
|---|---|
| Mn | 33.68 |
| Fe | 0.64 |
| P | 0.01 |

*Alloy*

| | Per cent |
|---|---|
| Fe | 88.12 |
| Mn | 3.69 |
| Si | 1.72 |
| P | 1.44 |

The only losses of Mn were mechanical.

II. The charge consisted of equal parts of manganese ore and manganese-silicon, finely ground and mixed as before. The ore and manganese-silicon had the following composition.

| | Ore | Manganese-silicon |
|---|---|---|
| | Per cent | Per cent |
| Mn (largely as $MnO_2$ | 56.50 | 68.76 |
| Fe | 2.15 | 2.76 |
| Si | | 23.56 |

Analysis of the products gave:

| | Manganese silicate slag | Alloy |
|---|---|---|
| | Per cent | Per cent |
| Mn | 48.30 | 86.26 |
| Fe | 0.16 | 4.76 |
| Si | | 7.78 |

The manganese of the ore was substantially all recovered in the slag, while the manganese of the manganese-silicon was recovered in the metallic portion of the reaction product.

I claim:

1. The process of working ores containing manganese dioxide and iron which comprises subjecting the ore to a self-propogating silico-thermic reduction using a quantity of silicon insufficient to reduce the manganese substantially beyond the manganous stage, and separating the non-metallic part of the reaction product as a manganiferous slag having a higher Mn to Fe ratio than the ore treated.

2. The process which comprises subjecting a manganese dioxide ore containing iron to a self-propogating silico-thermic reduction in a charge initially containing silicon and manganese dioxide in approximately the proportion required to reduce the manganese to the manganous stage only and separating the non-metallic parts of the reaction product as a manganiferous slag having a higher Mn to Fe ratio than the ore treated.

3. The process which comprises subjecting a manganese dioxide ore containing iron to a self-propagating silico-thermic reduction in a charge initially containing silicon and manganese dioxide in approximately the proportion required to reduce the manganese to the manganous state only; separating the non-metallic part of the reaction product as a manganiferous slag having a higher Mn to Fe ratio than the ore treated; and smelting said slag.

In testimony whereof, I affix my signature.

JOSEPH H. BRENNAN.